(12) United States Patent
Fried

(45) Date of Patent: Apr. 30, 2024
(10) Patent No.: US 11,969,799 B2

(54) METHOD FOR PRODUCING BLADES FROM Ni-BASED ALLOYS AND BLADES PRODUCED THEREFROM

(71) Applicant: MTU Aero Engines AG, Munich (DE)

(72) Inventor: Markus Fried, Valley (DE)

(73) Assignee: MTU Aero Engines AG, Munich (DE)

( * ) Notice: Subject to any disclaimer, the term of this patent is extended or adjusted under 35 U.S.C. 154(b) by 245 days.

(21) Appl. No.: 16/744,337

(22) Filed: Jan. 16, 2020

(65) Prior Publication Data
US 2020/0230744 A1 Jul. 23, 2020

(30) Foreign Application Priority Data
Jan. 18, 2019 (DE) ..................... 10 2019 200 620.5

(51) Int. Cl.
*B23K 26/342* (2014.01)
*B22F 5/04* (2006.01)
(Continued)

(52) U.S. Cl.
CPC ................ *B22F 5/04* (2013.01); *B22F 10/28* (2021.01); *B22F 10/32* (2021.01); *B22F 10/36* (2021.01);
(Continued)

(58) Field of Classification Search
CPC .............. B23K 26/342; B23K 2103/26; B23K 2101/001; B33Y 10/00
See application file for complete search history.

(56) References Cited

U.S. PATENT DOCUMENTS

| 4,851,055 A * | 7/1989 | Eylon | ..................... B22F 3/001 148/669 |
| 5,451,142 A * | 9/1995 | Cetel | ......................... F01D 5/28 415/200 |

(Continued)

FOREIGN PATENT DOCUMENTS

| DE | 102007059865 A1 | 6/2009 |
| DE | 102015102397 A1 | 8/2015 |

(Continued)

OTHER PUBLICATIONS

Ge et al, Effect of process parameters on microstructure of TiAl alloy produced by electron beam selective melting, 2014, Procedia Engineering, pp. 1192-1197 (Year: 2014).*
(Continued)

*Primary Examiner* — John J Norton
*Assistant Examiner* — Franklin Jefferson Wang
(74) *Attorney, Agent, or Firm* — Hinckley, Allen & Snyder, LLP; David R. Josephs

(57) ABSTRACT

The present invention relates to a method for producing a component of a turbomachine from a metal alloy as well as a correspondingly produced component, wherein the method includes defining at least one first component region that will have a first property profile, and at least one second component region that will have a second property profile which is different from the first property profile; providing at least one powder of the metal alloy or several different powders of constituents of the metal alloy; additive manufacture of the component from the at least one powder, wherein the powder is melted for cohesive joining of the powder particles to each other and to a substrate or to an already produced part of the component.

10 Claims, 2 Drawing Sheets

Figure 1:
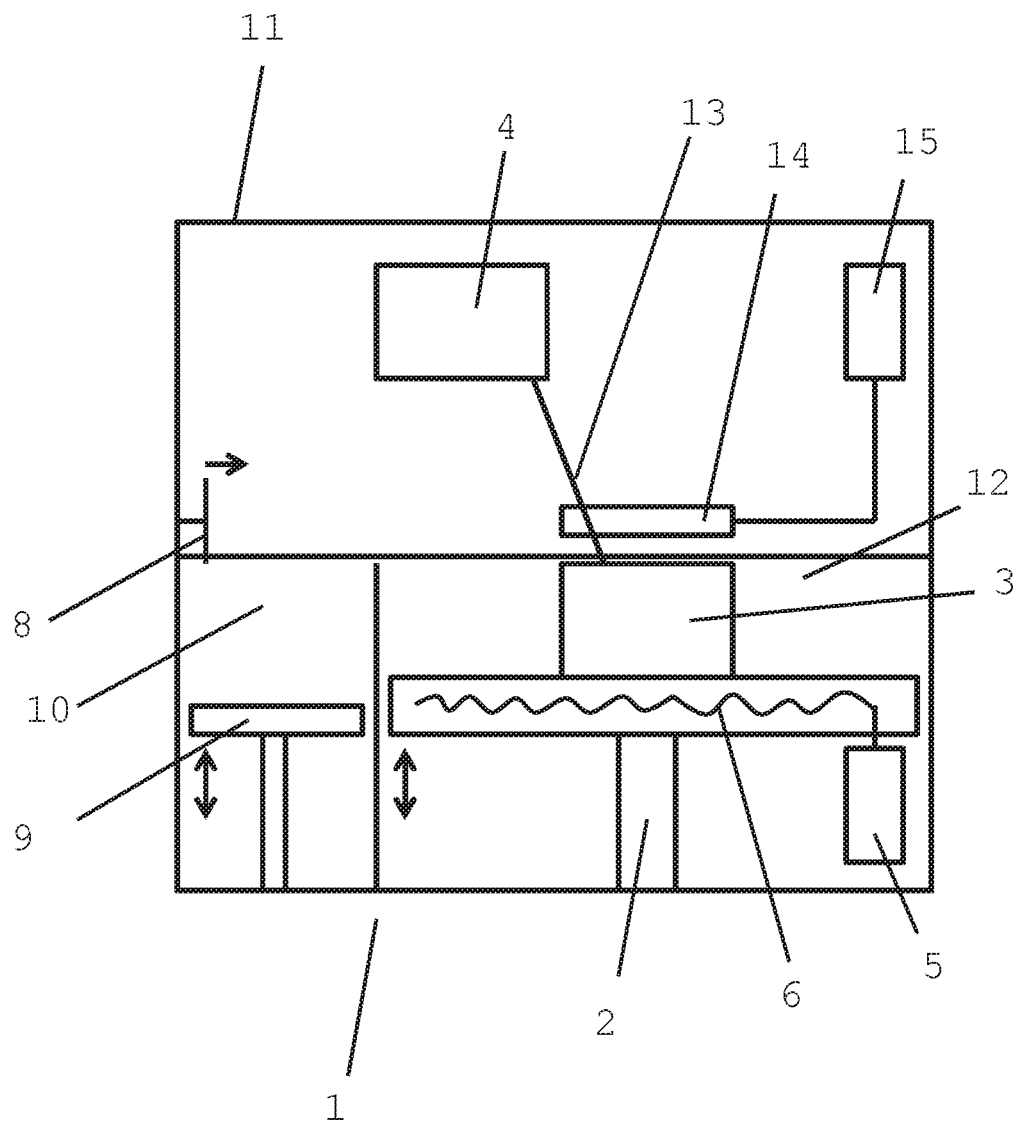

(51) Int. Cl.
| | |
|---|---|
| *B22F 10/28* | (2021.01) |
| *B22F 10/32* | (2021.01) |
| *B22F 10/36* | (2021.01) |
| *B22F 10/38* | (2021.01) |
| *B22F 12/13* | (2021.01) |
| *B23K 26/14* | (2014.01) |
| *B23K 26/323* | (2014.01) |
| *B23K 26/60* | (2014.01) |
| *B33Y 10/00* | (2015.01) |
| *B33Y 70/00* | (2020.01) |
| *B33Y 80/00* | (2015.01) |
| *F01D 5/14* | (2006.01) |
| *F01D 5/28* | (2006.01) |
| *F01D 5/30* | (2006.01) |
| *B22F 10/25* | (2021.01) |
| *B23K 101/00* | (2006.01) |
| *B23K 103/18* | (2006.01) |
| *C22C 19/05* | (2006.01) |

(52) U.S. Cl.
CPC ............ *B22F 10/38* (2021.01); *B22F 12/13* (2021.01); *B23K 26/1464* (2013.01); *B23K 26/323* (2015.10); *B23K 26/342* (2015.10); *B23K 26/60* (2015.10); *B33Y 10/00* (2014.12); *B33Y 70/00* (2014.12); *B33Y 80/00* (2014.12); *F01D 5/147* (2013.01); *F01D 5/28* (2013.01); *F01D 5/30* (2013.01); *B22F 10/25* (2021.01); *B23K 2101/001* (2018.08); *B23K 2103/26* (2018.08); *C22C 19/055* (2013.01); *C22C 19/056* (2013.01)

(56) References Cited

U.S. PATENT DOCUMENTS

| | | | | |
|---|---|---|---|---|
| 6,086,685 | A * | 7/2000 | Joller | C21D 9/04 |
| | | | | 148/334 |
| 9,796,137 | B2 | 10/2017 | Zhang et al. | |
| 10,710,159 | B2 * | 7/2020 | Corsmeier | B33Y 50/02 |
| 2013/0263977 | A1 * | 10/2013 | Rickenbacher | B23K 35/004 |
| | | | | 148/555 |
| 2014/0255198 | A1 * | 9/2014 | El-Wardany | B22F 10/28 |
| | | | | 419/7 |
| 2015/0197832 | A1 * | 7/2015 | Muralidharan | C22C 19/057 |
| | | | | 420/448 |
| 2016/0151860 | A1 * | 6/2016 | Engeli | C22C 19/03 |
| | | | | 148/538 |
| 2016/0214211 | A1 * | 7/2016 | Gregg | B23K 26/144 |
| 2017/0167000 | A1 * | 6/2017 | Dial | B22F 10/28 |
| 2017/0209923 | A1 * | 7/2017 | Giovannetti | C22C 19/056 |
| 2017/0239720 | A1 * | 8/2017 | Levin | B23K 26/702 |
| 2017/0260865 | A1 * | 9/2017 | Schloffer | B22F 5/04 |
| 2017/0297101 | A1 * | 10/2017 | Casper | B23K 13/01 |
| 2018/0023400 | A1 * | 1/2018 | Jones | B29C 64/153 |
| | | | | 415/115 |
| 2018/0200798 | A1 * | 7/2018 | Sharon | B22F 5/009 |

FOREIGN PATENT DOCUMENTS

| | | | | |
|---|---|---|---|---|
| DE | 102015210014 | A1 | 12/2016 | |
| EP | 2700459 | A1 | 2/2014 | |
| EP | 2772329 | A1 | 9/2014 | |
| EP | 2799179 | A1 | 11/2014 | |
| EP | 3238863 | A1 | 11/2017 | |
| FR | 3058457 | A1 * | 5/2018 | ............ B22F 1/0014 |
| WO | 2015094720 | A1 | 6/2015 | |

OTHER PUBLICATIONS

Ge et al, Effect of process parameters on microstructure of TiAl alloy produced by electron beam selective melting. Procedia Engineering 81: 1192-1197. (Year: 2014).*

Topology Optimization for Additive Manufacturing Considering Stress and Anisotropy, Henrik Alm Grundström, Degree Project Department of Economic and Industrial Development Linkoping University, Sweden, 685-0090-B (Jun. 2017).

"Influence of powder characteristics and Additive manufacturing process parameters on the microstructure and mechanical behaviour of Inconel 625 fabricated by Selective Laser Melting", Additive Manufacturing 512 (2018), Pleass, C., Jothi, S.

"Additive manufacturing of multi-material structures", Materials Science and Engineering: R: Reports, vol. 129, (Jul. 2018), pp. 1-16, Bandyopadhyay, A.

* cited by examiner

METHOD FOR PRODUCING BLADES FROM Ni-BASED ALLOYS AND BLADES PRODUCED THEREFROM

BACKGROUND OF THE INVENTION

The present invention relates to a method for producing a component of a turbomachine from a metal alloy, in particular a blade of a gas turbine or aircraft turbine as well as a correspondingly produced component, in particular a rotating blade of a gas or aircraft turbine from an Ni-based alloy.

In turbomachines such as stationary gas turbines or aircraft turbines, it is known in the prior art to form components that are subjected to high mechanical stresses and high temperatures as well as aggressive media at least partially from highly heat-resistant alloys such as, for example, Ni-, Fe- or Co-based alloys and, in particular, corresponding superalloys. Rotating blades that are subjected to high mechanical stresses at high operating temperatures due to centrifugal forces that arise are usually formed, in particular, from Ni-based superalloys.

Base alloys are understood to be alloys whose main component is the specified element such as, e.g., nickel and have additional alloy constituents in order to possess a desired property profile. Superalloys are understood as corresponding base alloys that have a composition with numerous alloy components for the formation of a complex microstructure, components such as, for example, chromium, molybdenum, titanium, aluminum, niobium, iron, and carbon in the case of Ni-based superalloys, in order to obtain high strength values by formation of precipitations or depositions.

Usually, rotating blades, for example, are produced close to their final contour by investment casting from Ni-based superalloys such as, e.g., the alloy known under the trade name IN 718. Of course, the geometry of the rotating blades with a rather large-volume blade root and a rather thinly dimensioned blade element or shroud in the transition region between blade root and blade element, brings about the circumstance that in the thin-walled regions, a fine-grained structure is produced by a high rate of cooling and the high nucleation rate caused thereby, whereas in the larger-volume region of the blade root having a slower cooling rate and a lower rate of nucleation, a coarse-grained structure is formed. Also, precipitations such as carbides with large particle sizes are formed in the large-volume region, whereas in regions of the rotating blades with thinner cross section, fine-grained precipitations such as carbides are formed.

Of course, providing a different structural formation for implementation in rotating blades is of some interest, since coarse-grained formation in the region of the blade root leads to unfavorable fatigue properties in this region of the rotating blades, while the formation of a fine-grained structure in the region of the blade element has an unfavorable influence on the creep resistance of the rotating blades. The unfavorable structural formation during the production by investment casting can be eliminated according to the prior art only by complex, expensive heat treatment methods.

SUMMARY OF THE INVENTION

Therefore, it is the object of the present invention to provide a method for producing components of a turbomachine, and particularly rotating blades, from Ni-based alloys, in which a favorable property profile can be established in a simple way. In particular, a rotating blade will be able to be produced, which has good fatigue properties, and particularly a high resistance to fatigue or fatigue strength in the root region, whereas a good creep resistance will be provided in the region of the blade element or in the region of a shroud. Additionally, the manufacturing method will be simple and reliably applicable.

This object is achieved by a method as well as a component of the present invention. Advantageous embodiments are discussed in detail below.

For a production of a turbomachine component with close to its final contour, and particularly the production of a rotating blade of a stationary gas turbine or of an aircraft turbine, the invention proposes to produce the component by an additive manufacturing method, also called a generative manufacturing method. In a method of this kind such as, for example, selective laser beam melting, selective laser beam sintering, selective electron beam melting, selective electron beam sintering, or deposition welding, the component is built up layerwise from at least one powder, by joining the powder in a cohesive manner to a substrate or an already produced part of the component in correspondence with the cross-sectional form in the plane that is to be built up, particularly by melting the powder particles and subsequent solidification. In order to obtain different property profiles in the component, the additive manufacture is conducted in different component regions, which are to have different property profiles, with different powder particles and/or different process parameters, so that different structures of the deposited material are formed in the different component regions that are to have the different properties. In this way, in spite of the one-piece, homogeneous formation of the component from a material with the same chemical composition, a different formation of properties over the component can be obtained.

Correspondingly, in the production of the component, initially at least one first component region can be defined, such as, for example, the root region of a rotating blade, which is to have a first property profile such as, for example, a high fatigue strength. Apart from this, at least one second component region can be defined, which is to have a second property profile that differs from the first property profile, whereby, for example, the latter may involve the region of the blade element that is to have a high creep resistance.

Correspondingly then, for the additive manufacture, at least one powder of a metal alloy is provided, from which powder the component is to be fabricated in one piece. However, several different powders may also be used, which differ, for example, in their chemical composition and/or in the size distribution of the powder particles. Although the component can usually be formed homogeneously from one material with the same chemical composition, powders with different chemical composition can be used, wherein the material from which the component is to be produced, is alloyed via the different powders during the manufacture. Of course, a powder that is already alloyed, i.e., powder particles with the same chemical composition as the component to be produced may also be used.

With respect to their size distribution, different powder particles can be used in order to establish different structures in the different component regions, i.e., the at least one first component region and the at least one second component region, and thus to establish different properties in the component regions.

Additionally or alternatively, for establishing different structures in the different component regions, it is possible to adjust differently the deposition parameters or process parameters for the additive manufacture in these component regions.

Thus, depending on the additive method used, a plurality of different parameters can be employed in order to establish different microstructures and thus different property profiles in the different component regions. In particular, the heating energy that is used to heat up or melt the powder particles can be selected differently in the different component regions. For example, the beam energy with which a laser beam or an electron beam is directed onto the powder to be melted can be selected differently. Also, the rate of feed and thus the residence time of a high-energy beam, for example, can be varied in a specific powder region. Further, the melting temperatures or the preheating temperatures of the powder material, which can be preheated prior to the melting, for example, by radiant heating or inductive heating, can be varied for establishing different structures, as can also the half-times of the powder in the molten state. It is also possible to establish different rates of melting and different cooling conditions with different cooling rates and different temperature gradients in the different component regions in the case of additive manufacture. Other parameters also, such as, for example a different ambient pressure of the surrounding atmosphere and a different composition of the surrounding atmosphere can be adjusted to establishing a structure in a targeted manner. The general deposition rate of the individual layers also can be selected differently in the different component regions, such as, for example, by different feed rates of a high-energy beam, for example, a laser beam or electron beam for melting the powder, or different material flows in the case of deposition welding.

The powder particles and/or the process parameters employed for the additive manufacture can not only be provided differently between a first component region and a second component region, but can also vary within the first and/or second component region or in the region of the transitions between the first and the second component regions, so that a material gradient with continuously varying property profile can be produced in the first and/or second component region and/or in the transition region between first component region and second component region, this gradient being based on a continually varying microstructure.

In particular, a blade, particularly a rotating blade of a turbomachine having a customized property profile can be produced in this way, wherein, for example, a structure that has an improved fatigue property can be established in the blade root region, while an improved creep resistance can be established in the blade element region or in the region of a shroud due to a structure corresponding thereto. For this case, for example, in the first component region, which corresponds to a blade root, a fine-grained structure with fine carbide precipitations can be formed, and in the second component region, which corresponds to the blade element and/or a shroud, a coarse-grained structure with coarse carbide precipitations can be formed. In addition to carbides, other precipitations or particles such as oxides, for example, or similar compounds can be used.

BRIEF DESCRIPTION OF THE DRAWING FIGURES

Figure 2:
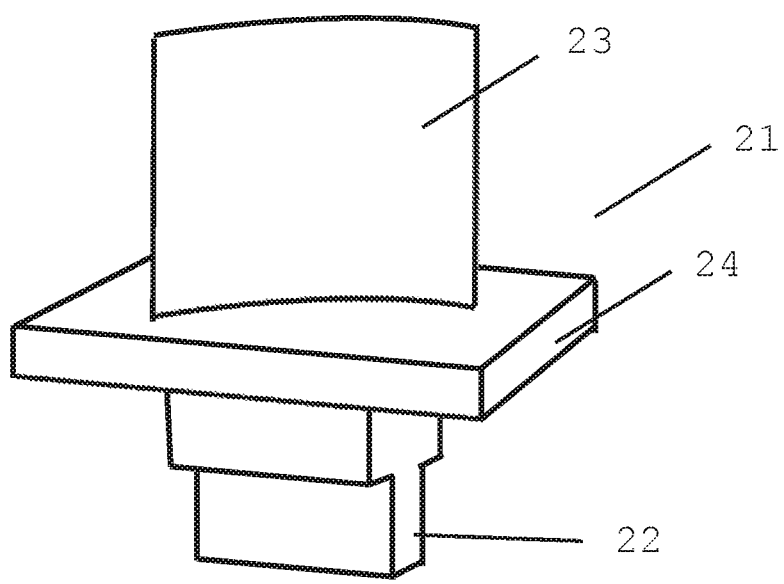

The appended drawings show in a purely schematic way in:

FIG. 1, a schematic representation of a device for the additive manufacture of components on the example of selective laser melting; and in FIG. 2, an illustration of a turbine blade that is manufactured corresponding to the method according to the invention.

DESCRIPTION OF THE INVENTION

Further advantages, characteristics and features of the present invention will become apparent in the following detailed description of examples of embodiment. Of course, the invention is not limited to these exemplary embodiments.

In a purely schematic representation, FIG. 1 shows a device 1, as can find use, for example, for selective laser melting for the additive manufacture of a component, and, in particular, a rotating blade The device 1 comprises a lift table 2, on the platform of which is disposed a semi-finished product or pre-product 3, onto which material is deposited layer by layer in order to produce a three-dimensional component in the form of a rotating blade for a turbomachine. For this purpose, powder 10 that is found in a powder supply container above a lift table 9, is moved by means of a slider 8, layer by layer, over the pre-product 3 and subsequently joined to the already present pre-product 3 by melting via the laser beam 13 of a laser 4. The powder material is joined to the pre-product 3 in a powder layer via the laser 4 according to the desired contour of the component to be fabricated, so that any three-dimensional form can be produced. Correspondingly, the laser beam 13 is guided over the powder bed 12 in order to melt powder material via different impact points on the powder bed corresponding to the contour of the three-dimensional component in the cutting plane corresponding to the sectional plane that has been produced, and to join to the already produced part of a component or to an initially provided substrate. In this way, the laser beam 13 can be guided over the surface of the powder bed 12 by a suitable deflection unit and/or the powder bed could be moved opposite the laser beam 13.

In order to avoid undesired reactions with the surrounding atmosphere during melting or sintering, the process can take place in an enclosed space that is provided by a housing 11 of the device 1, and an inert gas atmosphere can also be provided in order to avoid oxidation of the powder material, for example, and the like, during the deposition. For example, nitrogen, which is provided via a gas supply line (not shown), is used as the inert gas.

Instead of the inert gas, another process gas could also be used, if, for example, a reactive deposition of the powder material is desired.

Apart from this, other kinds of radiation are also conceivable, such as electron beams or other particle beams, or light beams that are used in stereolithography, for example.

For establishing the desired temperatures in the produced component 3 and/or in the powder bed 12, an electrical resistance heater with a resistance heating control 5 and an electrical heating filament 6 is provided in the lift table, so that the powder bed 12 and the component 3 can be preheated to a desired temperature by corresponding heating from below, and/or a desired temperature gradient can be established, in particular relative to the just processed layer at the surface of the powder bed. In a similar way, heating is provided by a heating apparatus from the top of the powder bed 12 and the already created component 3, which, in the exemplary embodiment shown, is formed by an induction heater having an induction coil 14 and an induction heating control 15. The induction coil 14 in this case surrounds the laser beam 13 and can be moved, as needed, parallel to the surface of the powder bed 12 corresponding to the laser beam 13.

Instead of the induction heater shown, any other kind of heater that enables a heating of the powder bed 12 and/or the already produced component 3 from the top also can be provided, such as, for example, radiant heating devices such as infrared heaters and the like. In the same way, the resistance heater 5, 6 can also be replaced by other suitable kinds of heating that make possible a heating of the powder bed 12 and the already produced component 3 from below. Apart from this, additional heating means surrounding the already produced component 3 and/or the powder bed 12 can be provided, in order to make possible a lateral heating of the powder bed 12 and/or the already produced component 3.

In addition to heating means, cooling means or combined heating/cooling means may also be provided, in order to be able to also carry out a targeted cooling, in addition to a heating of the already produced component 3 and the powder bed 12, in order to thereby be able to adjust and influence in a targeted manner the temperature balance in the powder bed and/or the produced component 3, in particular, relative to the powder layer melted by the laser beam 13 and the solidification front at the molten powder material.

According to the invention, the component can be divided into at least two component regions that are constructed from the same material relative to the chemical composition, but are formed with different structures due to use of different powders and/or process parameters in the additive manufacture. For this purpose, when a change is made from one component region to the other component region, only a corresponding exchange of powder material and/or a change of the deposition parameters need be carried out during the conduction of the additive manufacturing process.

FIG. 2 shows a blade 21 of a turbomachine having a blade element 23 and a blade root 23 as well as an inner shroud 24 arranged between blade element 23 and blade root 22. The blade 21 is formed, by way of example, of an Ni-based superalloy, as is known, for example, under the trade name IN 718. Of course, other Ni-based superalloys or other high-temperature alloys, such as, for example, Fe-based superalloys or Co-based superalloys are also conceivable.

The blade 21 is additively formed from a powder material of the Ni-based superalloy by selective laser beam melting, for example with a device from FIG. 1, wherein, layer by layer, corresponding to the cross section of the blade 21, the blade 21 is formed in a corresponding structural layer on the already manufactured part of the blade 21 by melting and solidifying the powder of the Ni-based superalloy. In this way, the entire blade 21 is constructed, layer by layer, from the Ni-based superalloy.

According to the invention, however, two component regions of the blade 21 are formed in different ways in order to produce different structural formations and thus different property profiles in the two component regions.

The first component region is formed by the blade root 22, wherein, in this region, a structure with grains that are as fine as possible of the Ni-based superalloy containing fine-grained carbide precipitations is formed in order to establish an advantageous fatigue behavior with a high fatigue strength. This can be achieved due to the fact that a finer-grained initial powder is selected for the additive manufacture of the blade root 22 than for the manufacture of the remaining part of the blade 21. Alternatively or additionally, it is also possible to suitably select the process parameters for the additive manufacture, such as, e.g., to select the build-up rate in the region of the blade root 22 higher than in the rest of the blade 21 to be formed, so that based on higher melting energy that is introduced as well as shorter residence time of the laser beam for melting the powder, and a higher cooling rate for the solidifying of the melt, more solidification nuclei are formed and thus a finer structure can be established than in the remaining region of the blade 21.

Correspondingly, the blade element 23 and/or the inner shroud 24 or the transition region between blade element 23 and inner shroud 24 can be defined as a second component region, in which, by use of a coarser initial powder and/or adjusted process parameters during the additive manufacture, e.g., with respect to a slower buildup rate with slower melting, longer residence time of the laser beam in the region of the molten powder and thus longer holding time of the powder in the molten state and slower cooling, a coarser structure with larger carbide precipitations than in the first component region or additional component regions can be established, which leads to the circumstance that the creep resistance is improved.

Thus, for example, for an Ni-based superalloy in the first component region, in the region of the blade root 22, particle sizes of up to a maximum of 500 μm, preferably up to a maximum of 100 μm can be established, while the carbide precipitations can have a maximum size of 30 μm, preferably a maximum of 10 μm, whereas in the second component region, in the region of the blade element, particle sizes of more than 500 μm are possible. In this case, the particle size can be determined as the mean particle size according to known methods for determining particle sizes or as the maximum dimension of the particles in one direction.

Although the present invention has been described in detail on the basis of the exemplary embodiments, it is obvious to the person skilled in the art that the invention is not limited to these exemplary embodiments, but rather that modifications are possible in such a way that individual features are omitted or other types of combinations of features can be realized, without leaving the scope of protection of the appended claims. In particular, the present disclosure encompasses all combinations of the individual features shown in the different examples of embodiment, so that individual features that are described only in conjunction with one exemplary embodiment can also be used in other exemplary embodiments or combinations of individual features that are not explicitly shown can also be employed.

What is claimed is:

1. A method for producing a monolithically formed component of a turbomachine from a metal alloy, which comprises the following steps:

defining at least one first component region within a monolithic component, said first component region having a first property profile that improves a first material characteristic of the at least one first component region, and at least one second component region within said monolithic component, said second component region having a second property profile that improves a second material characteristic of the at least one second component region, the second property profile being different from the first property profile and the second material characteristic being different from the first material characteristic;

providing at least one powder of the metal alloy or several different powders of constituents of the metal alloy;

additive manufacturing of the monolithic component from the at least one powder, wherein the powder is melted for cohesive joining of the powder particles to each other and to a substrate or to an already produced part of the monolithic component, and is additively deposited under such different conditions that different structures of the deposited material are produced in the first component region and in the second component region, wherein the at least one first component region and the at least one second component region have different micro structural formations;

wherein the property profile of the first component region has an improved fatigue strength than that in the second component region and the property profile in the second component region has a higher creep resistance than that in the first component region; and wherein a fine-grained structure with fine carbide precipitations is formed in the first component region, and a coarse-grained structure with coarse carbide precipitations is formed in the second component region.

2. The method according to claim 1, wherein during the additive manufacture, the monolithic component is built up layer-by-layer onto a substrate or a previously produced part of the monolithic component, wherein a layer-by-layer construction by layerwise deposition welding or layerwise melting of powder material with an energy-rich beam and layerwise solidifying of the molten powder.

3. The method according to claim 2, wherein the energy-rich beam is a laser beam or an electron beam.

4. The method according to claim 1, wherein, prior to the melting, a preheating of the powder material is carried out by radiant heating or inductive heating.

5. The method according to claim 1, wherein the different conditions for melting the powder comprise at least one item from the following group: different heating energy, different beam energy, different melting temperatures, different melting rates, different preheating times, different holding times in the molten state, different cooling conditions, different cooling rates, different temperature gradients, different ambient pressures, and different deposition rates.

6. The method according to claim 1, wherein the different powder particles and/or the different conditions for melting the powder during the production of the first and/or the second component region are varied over the corresponding first and/or second component region and/or in the transition region between the first and second component region, so that a gradient of material with varying property profile is deposited in the corresponding first and/or second component region and/or in the transition region.

7. The method according to claim 1, wherein the monolithic component is a rotating blade of a turbomachine, wherein the first component region comprises the blade root and the second component region comprises the region of an inner and/or outer shroud and/or the region of the blade element and/or the transition region between shroud and blade element.

8. The method according to claim 1, wherein the monolithic component is formed of an Fe-, Co- or Ni-based superalloy.

9. The method according to claim 1, wherein the monolithic component is made of an Fe-, Co- or Ni-based superalloy and is fabricated in one piece by additive manufacture.

10. The method according to claim 9, wherein the monolithic component is a blade of a turbomachine wherein the first component region comprises the blade root and the second component region comprises the region of an inner and/or outer shroud and/or the region of the blade element and/or the transition region between shroud and blade element.

* * * * *